US012810405B2

(12) United States Patent
Kelly et al.

(10) Patent No.: US 12,810,405 B2
(45) Date of Patent: Nov. 24, 2026

(54) INBOUND VIDEO MODIFICATION SYSTEM AND METHOD

(71) Applicant: Lenovo (Beijing) Limited, Beijing (CN)

(72) Inventors: Sean C. Kelly, Milton, FL (US); Koichiro Ishigami, Yokohama (JP); Xiang Feng, Shanghai (CN); Koji Kawakita, Yokohama (JP)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/533,379

(22) PCT Filed: Jul. 22, 2022

(86) PCT No.: PCT/CN2022/107245
§ 371 (c)(1),
(2) Date: Dec. 8, 2023

(87) PCT Pub. No.: WO2024/016296
PCT Pub. Date: Jan. 25, 2024

(65) Prior Publication Data
US 2025/0232421 A1 Jul. 17, 2025

(51) Int. Cl.
*G06T 7/00* (2017.01)
*G06F 3/14* (2006.01)
(Continued)

(52) U.S. Cl.
CPC .............. *G06T 7/0002* (2013.01); *G06F 3/14* (2013.01); *G06V 10/56* (2022.01); *G06V 10/764* (2022.01);
(Continued)

(58) Field of Classification Search
CPC ......... G06T 7/0002; G06T 2207/30168; G06F 3/14; G06V 10/56; G06V 10/764; H04N 23/661; H04N 7/147
(Continued)

(56) References Cited

U.S. PATENT DOCUMENTS

2006/0215168 A1* 9/2006 Gouch ...................... G06T 5/92 356/456
2008/0192447 A1* 8/2008 Koyama ................ H05K 3/303 257/E21.705
(Continued)

FOREIGN PATENT DOCUMENTS

CN 102484740 A 5/2012
CN 106537902 A 3/2017
CN 114365503 A 4/2022

OTHER PUBLICATIONS

International Search Report received for related PCT App No. PCT/CN2022/107245 dated Dec. 16, 2022 (8 pages).

*Primary Examiner* — Stephen P Coleman
(74) *Attorney, Agent, or Firm* — Carroll, Hoette & Butscher, LLC; Christopher R. Carroll

(57) ABSTRACT

A video modification system includes one or more processors configured to analyze inbound image data generated by a remote camera system and determine, based on the analysis, (i) at least one image quality deficiency of the inbound image data and/or (ii) an identity of the remote camera system. The one or more processors are configured to apply a set of one or more tuning parameters to the inbound image data to generate adjusted image data, and display the adjusted image data on a display device for viewing of the adjusted image data by a user. The one or more tuning parameters in the set are selected based on (i) the at least one image quality deficiency and/or (ii) the identity of the remote camera system.

16 Claims, 3 Drawing Sheets

(51) Int. Cl.
*G06V 10/56* (2022.01)
*G06V 10/764* (2022.01)
*H04N 23/661* (2023.01)

(52) U.S. Cl.
CPC . *H04N 23/661* (2023.01); *G06T 2207/30168* (2013.01)

(58) Field of Classification Search
USPC .......................................................... 382/190
See application file for complete search history.

(56) References Cited

U.S. PATENT DOCUMENTS

| | | | | |
|---|---|---|---|---|
| 2010/0134650 | A1* | 6/2010 | Kim | H04N 23/72 348/229.1 |
| 2010/0259551 | A1* | 10/2010 | Kao | H04N 9/73 345/590 |
| 2013/0265468 | A1* | 10/2013 | Morimura | H04N 23/69 348/240.2 |
| 2013/0308006 | A1* | 11/2013 | Finnila | H04N 23/617 348/222.1 |
| 2015/0124107 | A1* | 5/2015 | Muriello | H04N 21/440263 348/207.1 |
| 2015/0243041 | A1* | 8/2015 | Panetta | G06T 7/0002 382/164 |
| 2018/0241966 | A1 | 8/2018 | Reznik et al. | |
| 2020/0074682 | A1* | 3/2020 | Sunkavalli | G06T 7/80 |
| 2021/0272251 | A1* | 9/2021 | Unger | G06T 5/92 |
| 2022/0232189 | A1* | 7/2022 | Swierk | G06F 1/20 |

* cited by examiner

INBOUND VIDEO MODIFICATION SYSTEM AND METHOD

CROSS-REFERENCE TO RELATED APPLICATIONS

This application is a 35 U.S.C. § 371 national stage entry of International Patent Application No. PCT/CN2022/107245, which was filed on Jul. 22, 2022, and the entire disclosure of which is incorporated herein by reference.

FIELD

The present disclosure generally relates to altering incoming image data, such as image data for video conferencing.

BACKGROUND OF THE INVENTION

While streaming video, the quality of the inbound video stream received at a user's computer device is primarily affected by a remote camera system hardware and the network connection through which the video stream is communicated. Poor inbound image quality received by the user's computer device may impair the user's video call experience, due to lost image details, discoloration, noise, low frame rate, and/or the like. These issues are independent of the local camera system at the user's computer device, and therefore are not mitigated by improving the quality of the user's camera system. A need remains for remedying degradations and otherwise modifying image data characteristics in inbound video streams.

SUMMARY

In accordance with an embodiment, a video modification system is provided that includes a memory configured to store program instructions, and one or more processors operably connected to the memory. The program instructions are executable by the one or more processors to analyze inbound image data generated by a remote camera system, and determine, based on the analysis, (i) at least one image quality deficiency of the inbound image data and/or (ii) an identity of the remote camera system. The program instructions are executable by the one or more processors to apply a set of one or more tuning parameters to the inbound image data to generate adjusted image data, and display the adjusted image data on a display device for viewing of the adjusted image data by a user. The one or more tuning parameters in the set are selected based on (i) the at least one image quality deficiency and/or (ii) the identity of the remote camera system.

Optionally, the one or more processors may determine the at least one image quality deficiency based on the analysis, and the one or more processors apply the set of one or more tuning parameters to the inbound image data to mitigate the at least one image quality deficiency in the adjusted image data.

Optionally, the one or more processors are configured to determine the identity of the remote camera system based on the analysis, and the one or more processors apply the set of one or more tuning parameters to the inbound image data based on the identity of the remote camera system. The one or more processors may analyze the inbound image data by determining one or more image attributes of the inbound image data and comparing the one or more image attributes to a set of signature profiles. Each of the signature profiles may be associated with a different type of camera system, and the one or more processors may determine the identity of the remote camera system based on the comparison.

Optionally, the one or more processors may analyze the inbound image data by classifying one or more image attributes of the inbound image data. The one or more image attributes may include sharpness, contrast, color, noise, and/or distortion. The inbound image data may have one or more image attributes with a respective value outside of a target range, and the one or more processors may apply the set of one or more tuning parameters to the inbound image data to cause the respective value of the one or more image attributes of the adjusted image data to be within the target range. Optionally, the one or more processors may analyze the inbound image data by inputting the inbound image data into a machine learning algorithm. Alternatively, the one or more processors may analyze the inbound image data by performing one or more image processing measurements on the inbound image data.

Optionally, the video modification system may include the display device. The one or more processors and the display device may be operably connected to each other within a single computer device.

In accordance with an embodiment, a method of modifying inbound video image data is provided. The method includes analyzing, via one or more processors, inbound image data generated by a remote camera system, and determining, based on the analysis, (i) at least one image quality deficiency of the inbound image data and/or (ii) an identity of the remote camera system. The method includes applying a set of one or more tuning parameters to the inbound image data to generate adjusted image data, and displaying the adjusted image data on a display device for viewing of the adjusted image data by a user. The one or more tuning parameters in the set are selected based on (i) the at least one image quality deficiency and/or (ii) the identity of the remote camera system.

Optionally, the determining step determines the at least one image quality deficiency based on the analysis, and the applying step applies the set of one or more tuning parameters to the inbound image data to mitigate the at least one image quality deficiency in the adjusted image data.

Optionally, the determining step determines the identity of the remote camera system based on the analysis, and the applying step applies the set of one or more tuning parameters to the inbound image data based on the identity of the remote camera system. Analyzing the inbound image data may include determining one or more image attributes of the inbound image data and comparing the one or more image attributes to a set of signature profiles. Each of the signature profiles may be associated with a different type of camera system, and the determining step determines the identity of the remote camera system based on the comparison.

Optionally, analyzing the inbound image data may include classifying one or more image attributes of the inbound image data. The one or more image attributes may include sharpness, contrast, color, noise, and/or distortion. The inbound image data may have one or more image attributes with a respective value outside of a target range, and the set of one or more tuning parameters are applied to the inbound image data to cause the respective value of the one or more image attributes of the adjusted image data to be within the target range. Optionally, analyzing the inbound image data may include inputting the inbound image data into a machine learning algorithm. Alternatively, analyzing the inbound image data may include performing one or more image processing measurements on the inbound image data.

In accordance with an embodiment, a computer program product comprising a non-transitory computer readable storage medium is provided. The non-transitory computer readable storage medium includes computer executable code configured to be executed by one or more processors to analyze inbound image data generated by a remote camera system, and determine, based on the analysis, (i) at least one image quality deficiency of the inbound image data and/or (ii) an identity of the remote camera system. The computer executable code is configured to be executed by one or more processors to apply a set of one or more tuning parameters to the inbound image data to generate adjusted image data, and display the adjusted image data on a display device for viewing of the adjusted image data by a user. The one or more tuning parameters in the set are selected based on (i) the at least one image quality deficiency and/or (ii) the identity of the remote camera system.

Optionally, the one or more processors determine the at least one image quality deficiency based on the analysis, and the one or more processors apply the set of one or more tuning parameters to the inbound image data to mitigate the at least one image quality deficiency in the adjusted image data.

Optionally, the one or more processors determine the identity of the remote camera system based on the analysis, and the one or more processors apply the set of one or more tuning parameters to the inbound image data based on the identity of the remote camera system.

DETAILED DESCRIPTION

Figure 1:
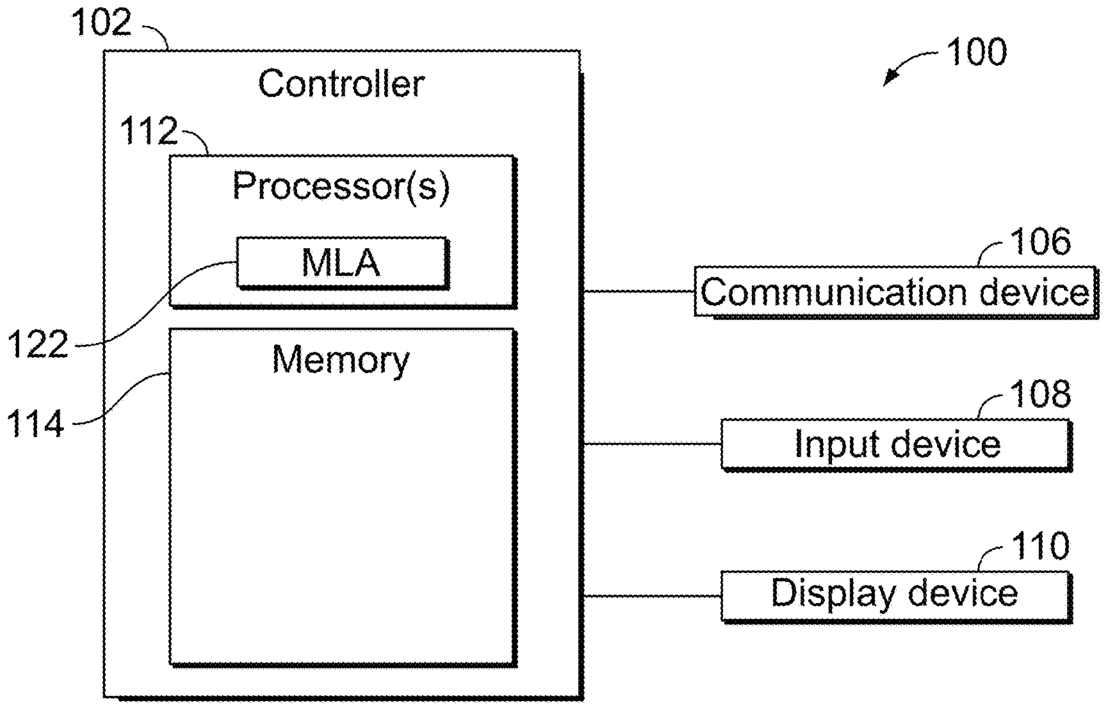
FIG. 1 is a block diagram of an inbound video modification system according to an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Embodiments described herein disclose an inbound video modification system and method for altering one or more image attributes or characteristics of an inbound video stream or feed. The system and method may alter the inbound image data to generally improve or enhance the quality or performance of the image data on the viewing side. For example, the inbound image data may be sub-optimal, due to noise, poor color contrast, poor clarity or sharpness, edge roll-off, and/or the like. The system and method described herein may alter the image data in the inbound video stream and render and display the altered image data to a user (e.g., observer) on a display screen, such that the displayed video is improved or enhanced relative to the inbound (e.g., received) video. The alterations may occur by applying one or more tuning parameters (e.g., image signal processing parameters) to the inbound image data. The tuning parameters that are applied are specific to the inbound image data and are selected based on an analysis of the inbound image data. In one or more embodiments, the system identifies image degradations in the inbound video quality and automatically corrects for the degradations using image processing and/or one or more machine learning algorithms.

The inbound video modification system and method disclosed herein are designed to improve the viewing experience of a user that observes a displayed video stream received from a remote source. The viewing experience may be improved by generally increasing the quality of the rendered and displayed video relative to simply rendering and displaying the inbound video as received. The modifications to the image data may cause the displayed video to have greater resolution, less noise, better contrast, less distortion, and/or the like, and may allow the user viewing the displayed video to see more details, more fully appreciate, and/or experience greater enjoyment in the content that is presented. The system and method described herein can be implemented without limiting or affecting the camera system that generates the image data or the communication pathway through which the image data is conveyed to the local computer device.

In an example use application, the inbound video modification system and method can be used during video conference calls. For example, the system may be integrated onto a computer device of a user that participates in a video conference call with one or more other participants using different respective computer devices. During the live video call, the user's computer device may receive a respective inbound video stream from each of the other participants that have their camera turned on. The video modification system on the user's computer device may operate to adjust the image data in one or more of the inbound video streams and may display the adjusted image data on a local display device for the user to view. For example, one or more of the video feeds that are displayed to the user during the call may be the adjusted image data generated by the video modification system, and the display video may have improved quality over the quality of the video received at the user's computer device. The video modification system may operate during the video call without affecting the other participants of the video call or requiring the other participants and/or the communication network to have specific types of hardware. The inbound video modification system and method disclosed herein is not limited to video conferencing call applications. Another application is streaming video content from the Internet, such as shows, movies, and short form videos.

References herein to "machine learning" and "artificial intelligence" refer to algorithms that learn from various automatic or manual feedback, such as observations and/or data. The artificial intelligence algorithms may be adjusted (e.g., trained) over multiple iterations based on the observations and/or data. For example, the artificial intelligence algorithms may be adjusted by supervised learning, unsupervised learning, and/or reinforcement learning (e.g., customer feedback). Non-limiting examples of artificial intelligence algorithms include decision trees, K-means, deep learning, artificial neural networks (e.g., convolutional neural networks), and/or the like.

References herein to "computer device", unless specified, shall mean any of various types of hardware devices that perform processing operations, such as servers, computer workstations, personal computers (e.g., laptop, desktop, tablet, smartphone, wearable computer, etc.), televisions, standalone video conference hub devices or stations, and the like.

FIG. 1 is a block diagram of an inbound video modification system 100 according to an embodiment. The inbound video modification system 100 (also referred to herein as video modification system and system) includes a controller 102 that performs some or all of the operations described herein to alter the inbound image data. The system 100 may also include a communication device 106, an input device 108, and/or a display device 110. The controller 102 is operably connected to the other components of the system 100 via wired and/or wireless communication links to permit the transmission of information in the form of signals. For example, the controller 102 may generate control signals that are transmitted to the other components to control the operation of the components. The system 100 may have additional components that are not shown in FIG. 1. In an alternative embodiment, the system 100 may lack one or more of the components shown in FIG. 1.

The controller 102 represents hardware circuitry that includes and/or is connected with one or more processors 112 (e.g., one or more microprocessors, integrated circuits, microcontrollers, field programmable gate arrays, etc.). The controller 102 includes and/or is connected with a tangible and non-transitory computer-readable storage medium (e.g., data storage device), referred to herein as memory 114. The memory 114 may store programmed instructions (e.g., software) that are executed by the one or more processors 112 to perform the video modification operations described herein. The programmed instructions may include one or more algorithms utilized by the one or more processors 112. For example, one or more algorithms stored in the memory 114 may be used by the processor(s) 112 to analyze received inbound image data and determine, based on the analysis, at least one image quality deficiency of the inbound image data and/or an identity of a remote camera system that generated the inbound image data. The one or more algorithms in the memory 114 may be used by the processor(s) 112 to select and then apply a set of tuning parameters to the inbound image data to generate adjusted image data. The set of tuning parameters includes one or more tuning parameters selected based on the at least one image quality deficiency and/or the identity of the remote camera system. The one or more algorithms may instruct the processor(s) 112 to display the adjusted image data on the display device 110 for the user to view the adjusted image data. References herein to the controller 102 may refer to the one or more processors 112.

The memory 114 may store one or more databases that contain information utilized by the one or more processors 112 to perform inbound video modification. For example, a camera database may include information about various different types of remote camera systems, which is used by the processor(s) 112 to identify the remote camera system that generated the inbound image data. A tuning parameter database may include a look-up table that links image quality deficiencies and/or remote camera system identities with corresponding sets of one or more tuning parameters that are associated with the image quality deficiencies and/or remote camera systems. Another database may include user settings. The memory 114 may store additional applications, such as various application program interfaces (APIs) that link to cloud hosting services, via the communication device 106, for accessing information from remote storage devices, such as servers.

The processor(s) 112 may include and/or implement at least one artificial intelligence (AI) machine learning algorithm 122 ("MLA" in FIG. 1). The algorithm 122 may be an artificial neural network. The machine learning algorithm 122 may be trained to provide image analysis and classification. In an embodiment, the machine learning algorithm 122 may classify image attributes in the inbound image data, such as sharpness/resolution, noise, color, contrast, distortion, dynamic range, and/or the like. The machine learning algorithm 122 may predict an identity of the remote camera system 204 that generated the image data and/or at least one image quality deficiency in the inbound image data, as described in more detail herein. In an alternative embodiment, the controller 102 does not include or apply any machine learning algorithm, but rather applies non-AI image parameter classification algorithms.

The communication device 106 represents hardware circuitry that can communicate electrical signals via wireless communication pathways and/or wired conductive pathways. The communication device 106 may remotely communicate audio and video. For example, the communication device 106 may be used to receive the inbound image data through a network, where the inbound image data is generated by a remote camera system. The communication device 106 may include transceiving circuitry, one or more antennas, and the like, for wireless communication. The communication device 106 may communicate with a cellular tower, a modem, a router, and/or the like. The communication device 106 optionally may be used by the controller 102 to communicate the adjusted image data, generated by the controller 102, to the display device 110 or another device.

The input device 108 is designed to receive user inputs (e.g., selections) from a user that interacts with the system 100. The input device 108 may include or represent a touch sensitive screen or pad, a mouse, a keyboard, a joystick, a switch, physical buttons, and/or the like. The user may actuate the input device 108 to generate input signals that are conveyed to the controller 102. The input signals may represent information and/or commands for operation of the system 100. For example, the user may select user settings via the input device 108. The user settings may include preferred ranges of one or more image attributes or characteristics. The user may also actuate the input device 108 to selectively activate and deactivate the system 100. For example, deactivating the system 100 may cause the controller 102 to render and display the inbound image data as received, without generating the adjusted image data.

The display device 110 includes a display screen that presents graphical indicia, such as images, shapes, text and symbols, for viewing by the user. The display device 100 may display the adjusted image data generated by the controller 102. The adjusted image data may be displayed as a video (e.g., a series of images over time having a designated frame rate). The display device 110 may display a graphical user interface (GUI) of an application or website, such as a video conferencing platform's application or website. The display device 110 may be integrated with a personal computer (e.g., laptop, tablet, smartphone, etc.), a television, or the like.

Figure 2:
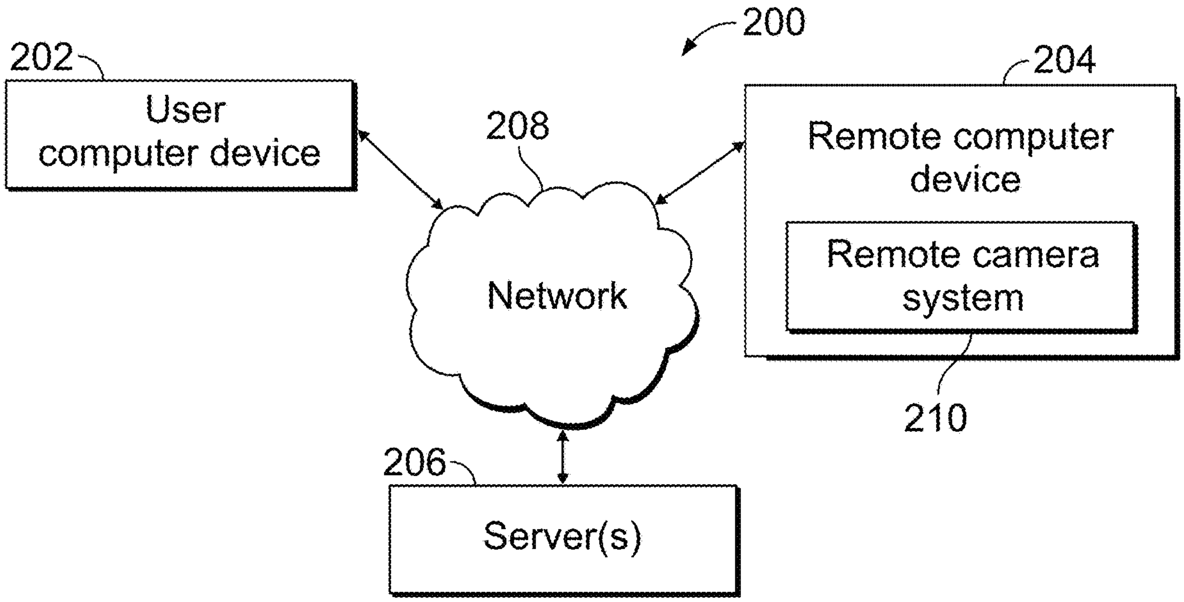
FIG. 2 is a diagram of a communication system according to an embodiment.

FIG. 2 is a diagram of a communication system 200 according to an embodiment. The communication system 200 includes a user computer device 202, at least one remote computer device 204, and one or more servers 206. The remote computer device 204 and the servers 206 may be external and remote from the user computer device 202. For example, the servers 206 may be located at a data center. The user computer device 202 may be communicatively connected to the remote computer device 204 and the servers 206 via a network 208. The network 208 may be the Internet, a local area network, or the like. The servers 206 may provide various cloud-based services to the user computer device 202 and/or the remote computer device 204 via the network 208. The services may include data storage and/or processing. The user computer device 202 represents a computer device that performs at least some of the operations of the inbound video modification system 100 described herein. The remote computer device 204 includes a remote camera system 210 that generates image data. The image data may be a video stream or feed that is communicated to the user computer device 202 via the network 208 and optionally the server(s) 206.

The user computer device 202 receives the video stream that is generated by the remote camera system 210 as inbound image data. In one example, the user computer device 202 and the remote computer device 204 may be participants in a video conference call. The video stream generated by the remote camera system 210 may depict a user of the remote computer device 204 who is in front of the remote camera system 210. Optionally, the user computer device 202 may have a local camera system that generates image data that is transmitted to the remote computer device 204 as outbound image data, but the system 100 described herein operates on inbound image data.

In an embodiment, at least most of the components of the system 100 shown in FIG. 1 are disposed on or within the user computer device 202. For example, the communication device 106, the input device 108, and the display device 110 may be commonly held within and/or on a housing or case of the user computer device 202. The user computer device 202 may be a smartphone, a tablet computer, a laptop computer, a desktop computer, a wearable computer, a television, or the like.

In one embodiment, the controller 102 of the system 100 is disposed only on the user computer device 202. For example, the user computer device 202 may contain the entire system 100, without requiring a communication link to the remote server(s) 206 to operation. In an alternative embodiment, the controller 102 of the system 100 may be distributed between the user computer device 202 and the one or more servers 206. For example, the servers 206 may include one or more processors and one or more data storage devices (e.g., memory devices). The one or more processors 112 of the system 100 may include one or more processors of the user computer device 202 and/or one or more processors of the servers 206. Furthermore, the memory 114 of the controller 102 may include one or more data storage devices of the user computer device 202 and/or one or more data storage devices of the servers 206. The network connection between the user computer device 202 and the server(s) 206 enables the devices to communicate with each other and operate in concert. For example, some functions of the inbound video modification system 100 may be performed on the user computer device 202 and other functions may be performed by the server(s) 206.

The system 100 optionally may be used in conjunction with a video conferencing platform and/or a video streaming platform. For example, the operations of the system 100 may be incorporated into the program instructions of a video conferencing and/or video streaming application that is downloaded onto the user computer device 202. The controller 102 of the system 100 may be activated upon a user input selection to initiate the application.

Figure 3:
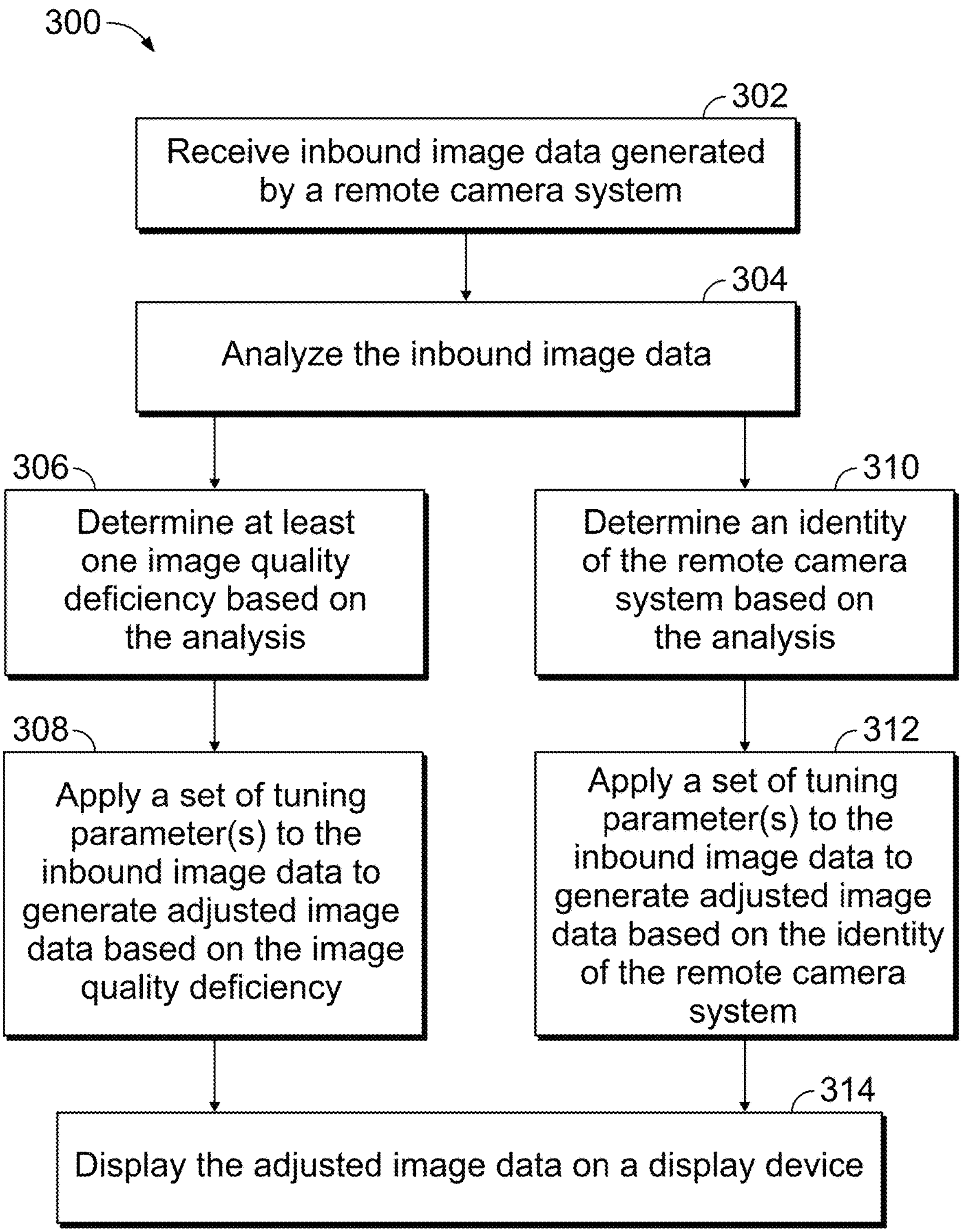
FIG. 3 is a flow chart of a method of modifying inbound video image data according to an embodiment.

FIG. 3 is a flow chart 300 of a method of modifying inbound video image data according to an embodiment. The method may be performed by the controller 102, such as the one or more processors 112 thereof. Some aspects of the method may be performed by the machine learning algorithm 122 or another computer-based model. The method optionally may include at least one additional step than shown, at least one fewer step than shown, and/or at least one different step than shown in FIG. 3.

At step 302, the controller 102 receives inbound image data that is generated by a remote camera system, such as the remote camera system 210 shown in FIG. 2. The inbound image data may be a video stream that includes a series of image frames over time. The video stream is designed to be displayed at a designated frame rate. In an alternative embodiment, the inbound image data may be one or more images that do not constitute video. The inbound image data may be received during a streaming event, such as a video conference call, watching video content from an online content source (e.g., application), or the like. The inbound image data may be received through the network 208. The source of the inbound image data may be the remote computer device 204 and/or the server(s) 206.

At step 304, the controller 102 analyzes the inbound image data that is received. The controller 102 analyzes the inbound image data in an attempt to classify aspects of the image data, for the purpose of determining which tuning parameters to apply to the inbound image data in order to correct, enhance, or otherwise improve the quality of the image data that is subsequently displayed to the user (relative to the received inbound image data). The aspects of the image data that are analyzed may be image attributes, rather than the content depicted in the image data. The image attributes refer to characteristics or properties of the images, such as color, resolution, sharpness, noise, contrast, and/or the like. The controller 102 may use the attributes to identify one or more image quality deficiencies in the image data and/or to identify the remote camera system that generated the inbound image data. The controller 102 may select which tuning parameters to apply to the inbound image data based on the identified image quality deficiencies and/or emote camera system.

In one or more embodiments, the controller 102 may analyze the inbound image data by inputting the image data into the machine learning algorithm 122 that is trained to classify the image data and provide a prediction as output. In an embodiment, the prediction from the machine learning algorithm 122 may be a candidate type of camera system that is predicted to be the original source of the inbound image data. In another embodiment, the machine learning algorithm 122 may be trained to predict one or more image quality deficiencies present in the inbound image data.

Figure 4:
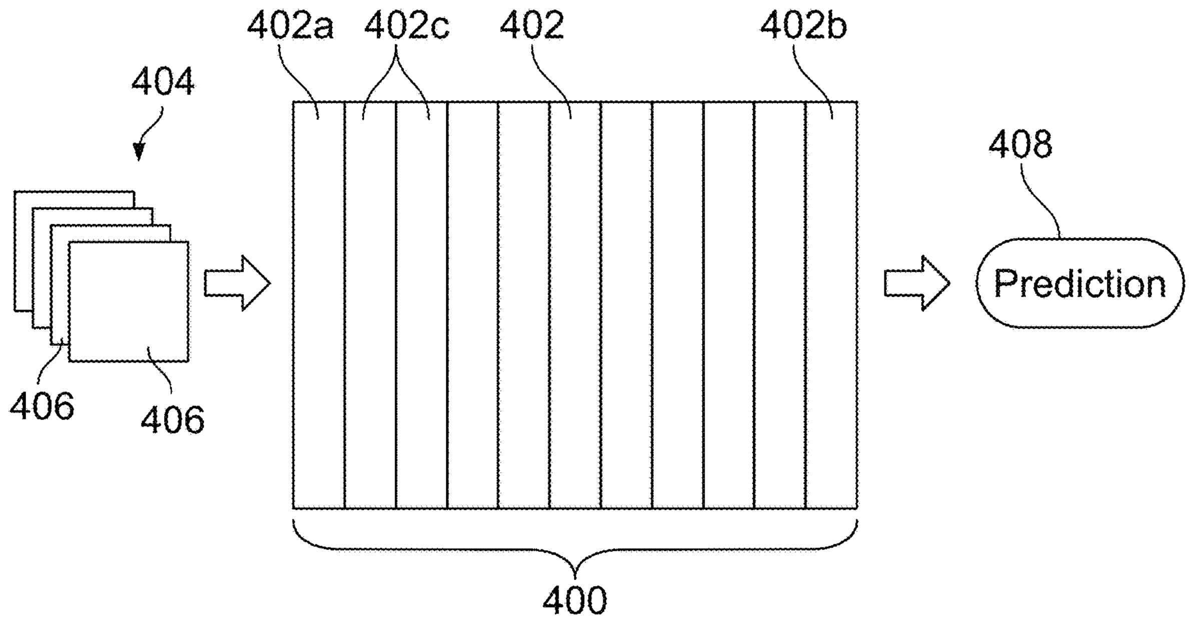
FIG. 4 is a diagram showing an artificial neural network that represents a machine learning algorithm according to an embodiment.

The machine learning algorithm 122 may be an artificial neural network. FIG. 4 is a diagram showing an artificial neural network 400 that represents the machine learning algorithm 122 according to an embodiment. The neural network 400 may be divided into multiple layers 402, such as an input layer 402*a* that receives input image data, an output layer 402*b* that outputs a predicted classification, and one or more intermediate layers 402*c* between the input and the output layers 402*a*, 402*b*. The layers 402 may represent different groups or sets of artificial neurons or nodes, which are functions trained to perform classification operations in the input image data. The artificial neurons may apply different weights in the functions applied to the input image data.

The controller 102 may input the inbound video 404 into the neural network 400 through the input layer 402*a*. The inbound video 404 may be a series of individual images 406. The neural network 400 may analyze multiple images 406 in the series. Alternatively, the neural network 400 may only analyze a single image 406 in the series. The neural network 400 may be trained via analyzing training images to make a prediction 408 about an object class. In an embodiment, the object class is a remote camera system type or identity.

For example, at step 310 of the method 300, the controller 102 determines an identity of the remote camera system 210 that generated the inbound image data based on the analysis of the inbound image data. In an embodiment, the controller 102 uses the machine learning algorithm 122 to analyze the image data and determine the identity of the remote camera system 210. For example, the machine learning algorithm 122 (e.g., the neural network 400) may be trained using a set of training images associated with each of multiple different types of camera systems. The training images may be generated by the different camera systems. The camera systems may include different models manufactured by the same company and/or different companies. For example, the machine learning algorithm 122 may be trained by analyzing hundreds of images generated by each of a first camera system, a second camera system, a third camera system, and a fourth camera system. The training optionally may include more or less than four camera systems.

During the analysis of the multitude of training images, the machine learning algorithm 122 may identify certain unique characteristics or unique combinations of characteristics that are associated with the first camera system only. The machine learning algorithm 122 may do the same for the other camera systems. For example, the machine learning algorithm 122 may determine that the training images generated by the first camera system generally have a center to edge roll-off which is not present in the training images generated by the other camera systems. In another example, the machine learning algorithm 122 may determine that the training images generated by the second camera system have a sharpness range, color contrast, and noise ratio that, in combination, are unique to the second camera system. The unique characteristics and combinations of characteristics in the images represent signatures of the different corresponding camera systems. Once trained, the machine learning algorithm 122 can be used to identify an unknown camera system that generated an image or a series of images by analyzing the input image(s) to detect one or more of the signatures.

Referring back to FIG. 4, the neural network 400 may be trained to examine one or more of the input images 406 and predict which of the known camera systems, based on the training, generated the images 406. The known camera systems may represent different object classes. The prediction 408 output by the neural network 400 may indicate probabilities for one or more of the object classes. For example, the prediction 408 may indicate that the neural network 400 predicts that the images 406 were generated by the third camera system with 95% confidence. As described above, this prediction may be based on commonalities between attributes of the image(s) 406 and the training data associated with the third camera system. The third camera system may be a candidate camera system that the controller 102 predicts as the original source of the inbound image data.

In an alternative embodiment, the identity of the remote camera system may be determined without using a machine learning algorithm. For example, the controller 102 may analyze the inbound image data by determining one or more image attributes of the inbound image data. The controller 102 may then compare the image attribute(s) to a set of signature profiles associated with different camera systems. For example, a first signature profile is associated with the first camera system, a second signature profile is associated with the second camera system, and so on. Each signature profile is unique from the other signature profiles. For example, the signature profile associated with the first camera system may have a value or range of a first image attribute that is different from the value or range of the first attribute in images generated by the other camera systems, such that this value or range of the first image attribute distinguishes an image generated by the first camera system from images generated by the other camera systems in the group. The controller 102 may determine the identity of the remote camera system by comparing the determined image attributes in the inbound image data to the different signature profiles. For example, the controller 102 may determine which of the signature profiles in the set best matches (e.g., has greatest amount or percentage of correspondence with) the attributes in the inbound image data, and then identifies the remote camera system as the type of camera system associated with the best-matching signature profile. For example, if the attributes in the inbound image data best match the signature profile of the fourth camera system in the set, then the controller 102 identifies the remote camera system as the fourth camera system.

The controller 102 may be programmed to analyze the inbound image data to determine one or more image attributes of the image data. Some example image attributes include sharpness, contrast, color, noise, and distortion. In an embodiment, the controller 102 may perform one or more image processing measurements on the inbound image data to determine the attributes. For example, the controller 102 may sample a small portion of an image and analyze the pixels to measure sharpness, contrast, color, noise, and/or distortion in the sample. The controller 102 may repeat the process on multiple different areas of the same image. The controller 102 may repeat the process of multiple different images in the inbound image data.

The controller 102 may perform image processing algorithms or techniques to determine values of the one or more attributes. The controller 102 may use the values to classify the image attributes of the inbound image data. The controller 102 may then compare the determined attribute values to respective target ranges of the attributes. The target ranges may be pre-selected and stored in the memory 114. For example, the controller 102 may compare the determined value of a noise attribute to a target noise range. If the determined noise value is within the noise range, then the controller 102 may classify the inbound image data as being within range for noise. If the determined noise value is outside of the noise range, then the controller 102 may classify the inbound image data as outside of the noise range. The controller 102 may flag attributes that are out of the target ranges for tuning to correct, enhance, or otherwise improve those attributes in the adjusted image data. For example, a specific noise-related tuning parameter may be applied to the inbound image data such that the adjusted image data that is generated has a noise value that is within the target noise range.

The controller 102 may access a look-up table in the memory 114 that links the signature profiles with the different camera systems. For example, the controller 102 may determine, based on the classified values and types of the image attributes in the inbound image data, that the image data is most similar to a first signature profile. The look-up table may indicate that the first signature profile is associated with a first type of camera system. Based on this association, the controller 102 identifies the remote camera system that generates the inbound image data as the first type of camera system.

With reference to the flow chart in FIG. 3, once the identity of the remote camera system is determined, the flow continues to step 312. At step 312, a set of one or more tuning parameters is applied to the inbound image data to generate adjusted image data. The set of tuning parameter(s) may be selected based on the identity of the remote camera system. The image data generated by the different camera systems may have predetermined or pre-selected properties or characteristics that could be improved or enhanced by performing one or more tuning parameters on the image data. As an example, it may be known that the sharpness provided by a given camera system is outside of a desired sharpness range. If that camera system is identified as the source of the inbound image data, one of the tuning parameters in the set may address the sharpness such that the adjusted image data that is generated has a sharpness that is within the desired range. The tuning parameters may include image processing maps, files, and/or blocks that are stored in the memory 114 (or at the servers 206). Each tuning parameter may be designed to repair a respective image attribute of the inbound image quality to a pre-defined target range.

One example tuning parameter is modulation transfer function (MTF) compensation of blurred image data. For example, if the sharpness image attribute is outside of a target range, then the MTF compensation tuning parameter may be applied to the image data. The MTF compensation may apply a convolution kernel or other sharpness processing to the image data to restore the image data to a sharpness aim or target range (e.g., designated sharpness threshold). The kernel may be defined with a frequency response that is the frequency-by-frequency ratio of the inbound image data and the target sharpness range.

Another example tuning parameter is color correction compensation of discolored incoming image data. The color correction compensation tuning parameter may be applied by applying white balance and/or color correction adjustment to the inbound image data to a target color range.

Contrast compensation may be another tuning parameter. Contrast compensation is applied to modify the tone scale to adjust the rendering of the image data to a target contrast range or aim. For example, if the inbound image data is low contrast or flat, a higher contrast tone scale may be applied to provide an enhanced tone rendering in the adjusted image data. The selection of the tone scale by the controller 102 may be based on the identification of the remote camera system 210.

Another example tuning parameter may be noise reduction. The noise reduction that is applied by the controller 102 may include sigma filtering, bilateral filtering, time-based (multi-frame) filtering, or the like. The noise reduction parameter may be applied at a predetermined strength or level to achieve a target signal-to-noise (SNR) range or value. The target SNR range or value may be visually balanced with image texture detail.

Distortion correction may be another tuning parameter that is applied to distorted inbound image data. The distorted image data may include image data that is barrel, pincushion, mustache, and/or the like. The distortion correction tuning parameter may be applied to the distorted image data by applying a field adaptive digital zoom processing that corrects for the distortion profile of the inbound image data. The specific distortion correction parameters applied may be based on the identification of the remote camera system 210.

Other tuning parameters may include color aberration correction of per color channel blurred image data and color aberration correction of per color channel distorted image data. The blurred image data may be longitudinal color, and the distorted image data may be lateral color. For example, the controller 102 may apply color channel adaptive digital zoom processing to correct for lateral color aberrations (e.g., distortion). The controller 102 may apply color channel adaptive sharpening to correct for longitudinal color aberrations (e.g., blurring). The specific color aberration parameters applied may be based on the identification of the remote camera system 210.

In an embodiment, the controller 102 may select a set of one or more tuning parameters to apply to the inbound image data based on the identification of the remote camera system. For example, associations between different types of camera systems and different sets of the tuning parameters may be stored in the memory 114 (or in the servers 206). The associations may be in the form of a look-up table or database. Once the type of remote camera system is identified, the controller 102 may determine, based on the respective association, which set of one or more tuning parameters to apply to the inbound image data. In an example, it may be pre-determined that the image data generated by a particular camera system has several image quality deficiencies or degradations, such as dark corners, center to edge roll-off, excess noise, excess blurring, and/or the like. The image quality deficiencies or degradations may refer to, or based on, image attributes that have respective values outside of the target range. The set of tuning parameters associated with that camera system may be selected to address and mitigate the known image quality deficiencies or degradations.

After selecting the set of one or more tuning parameters to apply, the controller 102 then applies the tuning parameters of the set to the inbound image data to generate the adjusted image data. The tuning parameters applied to the inbound image data may cause one or more of the image attributes, which were previously outside of the target range, to be within the target range in the adjusted image data. For example, if the SNR of the inbound image data is out of the target noise range (e.g., due to excess noise), then applying the noise reduction tuning parameter(s) may reduce the noise and yield a SNR of the adjusted image data that is within the target noise range. In an embodiment, the adjusted image data may only modify the portions of the inbound image data that are affected by the application of the tuning parameters. The content of the adjusted image data may be the same as the content of the inbound image data.

At step 314, after generating the adjusted image data, the controller 102 may display the adjusted image data on the display device 110 for viewing by the user. For example, during a video conference call, the adjusted image data may depict another participant that is on the call with the user at the user computer device 202. The images and video displayed by the display device 110 according to the adjusted image data may have improved image quality relative to displaying images and video according to the unaltered inbound image data. For example, the user viewing the display device 110 during a streaming event may be able to view more details and may have a more favorable (e.g., enjoyable) experience by the controller 102 displaying the adjusted image data rather than the inbound image data. The displayed images and video may have a greater resolution, greater clarity, greater sharpness, a more desirable tone scale, fewer image deficiencies, and/or the like, relative to images and video based on the inbound image data.

Returning now to step 306, optionally the controller 102 and/or machine learning algorithm 122 may analyze the inbound image data to determine at least one image quality deficiency in the inbound image data. Optionally, step 306 may be performed instead of step 310, which determines the identity of the remote camera system. Optionally, the controller 102 may perform step 306 if step 310 is unsuccessful at positively identifying the remote camera system 210. For example, if the machine learning algorithm 122 is not able to predict the type of camera system that generated the inbound image data with a probability above a lower threshold level (e.g., 50%, 60%, 70% or the like), then the controller 102 may move to step 306.

As described above, an image quality deficiency may refer to an image attribute that have a value outside of a target range. For example, if the wavelengths of the tone scale are outside of a target range, then the inbound image data may have an image quality deficiency with respect to contrast. In an embodiment, the controller 102 may determine the at least one image quality deficiency in the inbound image data by inputting one or more image frames of the image data into a machine learning algorithm that is trained to identify image quality deficiencies in image data. The machine learning algorithm for identifying deficiencies may be similar to the machine learning algorithm trained to identify the remote camera system that generated the inbound image data. For example, the machine learning algorithm for identifying deficiencies may include a neural network. The machine learning algorithm may output a prediction that classifies types of image quality deficiencies found in the image data. For example, the machine learning algorithm may be trained to detect edge roll-off, excessive color variations (e.g., dark corners), noise, distortion, blurring, incorrect tone scale, and/or the like. The machine learning algorithm may list the types of image quality deficiencies and may also provide a respective probability that each of the listed deficiencies are present. In this case, the image quality deficiencies may represent the object classes.

As an alternative to inputting the inbound image data into a machine learning algorithm, the controller 102 may apply one or more classical (e.g., non-AI) image processing algorithms to determine the image quality deficiencies present. For example, the controller 102 may apply a series of tests that measure image attributes of the inbound image data. The controller 102 may then compare the measured values to target ranges or values for the corresponding image attributes. If the measured value for a given attribute is outside of the target range, then the controller 102 may determine that an image quality deficiency associated with that attribute is present.

At step 308, the controller 102 may apply a set of one or more tuning parameters to the inbound image data to generate adjusted image data. The set of one or more tuning parameters may be selected by the controller 102 based on the one or more image quality deficiencies determined to be present in the image data. For example, the controller 102 may consult a database or look-up table in the memory 114 that provides associations between individual image quality deficiencies and tuning parameters. Each tuning parameter in the association is designed to mitigate the associated image quality deficiency. As such, by applying the set of tuning parameters to the inbound image data, the adjusted image data that is generated has fewer and/or less noticeable image quality deficiencies than the inbound image data. The available tuning parameters to apply to the image data may be the same as the tuning parameters described in step 312. In this case, rather than applying a set of tuning parameters based on the identified source camera system, the tuning parameters may be individually selected based on each identified image quality deficiency that is present in the inbound image data.

After step 308, the method proceeds to step 314 to display the adjusted image data, as described above.

The inbound video modification system and method described herein may improve the image quality of displayed video during a streaming event, such as a video conference call, independently of the image-generating camera system and the network through which the inbound video is communicated. The inbound video modification system and method identifies image degradations in the inbound video quality and automatically mitigates the image degradations. The system and method may use deep learning algorithms and software-based image processing algorithms.

In an embodiment, the inbound video modification system and method may determine the imaging deficiencies on the inbound image data by classifying image attributes such as SFR/resolution, noise, color, contrast, and/or dynamic range. The system and method may attempt to identify a candidate camera system that generated the inbound image data based on detecting a signature in the image data that is associated with a specific type of camera system. Then, the system and method may apply a battery of tuned correction algorithms to the inbound image data to mitigate the detected deficiencies.

CLOSING STATEMENTS

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A video modification system comprising:

a memory configured to store program instructions; and one or more processors operably connected to the memory, wherein the program instructions are executable by the one or more processors to:

analyze inbound image data received at the video modification system after generation of the inbound image data by a remote camera system and before local display of the inbound image data, the inbound image data analyzed by sampling pixel regions across multiple images of the inbound image data to measure a plurality of image-quality values for at least two image attributes selected from sharpness, contrast, color, noise, or distortion, and classifying each of the plurality of image-quality values as within or outside a respective pre-selected target range stored in the memory;

determine, based on analyzing the inbound image data, an identity of the remote camera system by comparing the plurality of image-quality values measured from the sampled pixel regions to a set of signature profiles stored in the memory, each of the signature profiles associated with a different camera system type and comprising stored values or ranges for a combination of image attributes generated by that camera system type, and identifying, as the identity of the remote camera system, the camera system type whose signature profile has a greatest correspondence with the plurality of image-quality values;

select, from a tuning-parameter database stored in the memory, a first set of tuning parameters based on (i) the identity of the remote camera system and (ii) at least two of the image attributes classified as outside the respective pre-selected target ranges, wherein the tuning-parameter database stores associations between different camera system types, image quality deficiencies associated with the different camera system types, and corresponding sets of tuning parameters configured to repair the image quality deficiencies;

apply the first set of the tuning parameters to the inbound image data to generate adjusted image data without changing operation of the remote camera system or a communication pathway through which the inbound image data is received, the first set of the tuning parameters including at least two of:

(a) modulation transfer function (MTF) compensation applied responsive to sharpness being outside the respective pre-selected target range, (b) white balance or color correction adjustments applied responsive to color being outside the respective pre-selected target range, (c) contrast compensation that modifies tone scale applied responsive to contrast being outside the respective pre-selected target range, (d) noise reduction filtering applied responsive to noise or signal-to-noise ratio being outside the respective pre-selected target range, or (e) distortion correction by applying field-adaptive digital zoom processing responsive to distortion being outside the respective pre-selected target range, wherein applying the first set causes respective values of the at least two image attributes classified as outside the respective pre-selected target ranges to be within the respective pre-selected target ranges; and display the adjusted image data on a display device for viewing of the adjusted image data by a user.

2. The video modification system of claim 1, wherein the one or more processors are configured to determine at least one image quality deficiency based on analyzing the inbound image data, and the one or more processors are configured to apply the first set of the tuning parameters to the inbound image data to mitigate the at least one image quality deficiency in the adjusted image data.

3. The video modification system of claim 1, further comprising the display device, wherein the one or more processors and the display device are operably connected to each other within a single computer device.

4. The video modification system of claim 1, wherein the first set of the tuning parameters includes MTF compensation applied responsive to the sharpness being outside the respective pre-selected target range for sharpness, the MTF compensation comprising applying a convolution kernel having a frequency response based on a frequency-by-frequency ratio of the inbound image data and a target sharpness range.

5. The video modification system of claim 1, wherein the first set of the tuning parameters that is applied includes one or both of the white balance or the color correction adjustments applied to cause the color to be within the pre-selected target range.

6. The video modification system of claim 1, wherein the first set of the tuning parameters that is applied includes the noise reduction filtering applied at a predetermined strength to achieve a signal-to-noise ratio within the pre-selected target range.

7. The video modification system of claim 1, wherein the first set of the tuning parameters that is applied includes the distortion correction by applying field-adaptive digital zoom processing to correct for a distortion profile of the inbound image data.

8. The video modification system of claim 1, wherein the first set of the tuning parameters also includes color channel adaptive digital zoom processing to correct lateral color aberrations, and color channel adaptive sharpening to correct longitudinal color aberrations.

9. The video modification system of claim 1, wherein the first set of the tuning parameters is one of multiple different sets of tuning parameters stored in the tuning-parameter database, and wherein the one or more processors select the first set from the multiple different sets based on the identity of the remote camera system.

10. The video modification system of claim 1, wherein analyzing the inbound image data comprises inputting at least a portion of the inbound image data into a machine learning algorithm, and wherein the machine learning algorithm is an artificial neural network trained to predict the camera system type from the inbound image data and one or more image quality deficiencies present in the inbound image data.

11. The video modification system of claim 1, wherein sampling the pixel regions across the multiple images includes sampling the pixel regions in multiple different areas of a same image of the multiple images to measure the sharpness, the contrast, the color, the noise, and the distortion.

12. The video modification system of claim 1, wherein the first set of the tuning parameters includes contrast compensation that modifies tone scale to adjust rendering to the pre-selected target range.

13. A method comprising:

analyzing, via one or more processors, inbound image data received at a video modification system after generation of the inbound image data by a remote camera system and before local display of the inbound image data, the inbound image data analyzed by sampling pixel regions across multiple images of the inbound image data to measure a plurality of image-quality values for at least two image attributes selected from sharpness, contrast, color, noise, or distortion, and classifying each of the plurality of image-quality values as within or outside a respective pre-selected target range stored in a memory;

determining, based on analyzing the inbound image data, an identity of the remote camera system by comparing the plurality of image-quality values measured from the sampled pixel regions to a set of signature profiles stored in the memory, each of the signature profiles associated with a different camera system type and comprising stored values or ranges for a combination of image attributes generated by that camera system type, and identifying, as the identity of the remote camera system, the camera system type whose signature profile has a greatest correspondence with the plurality of image-quality values;

selecting, from a tuning-parameter database stored in the memory, a first set of tuning parameters based on (i) the identity of the remote camera system and (ii) at least two of the image attributes classified as outside the respective pre-selected target ranges, wherein the tuning-parameter database stores associations between different camera system types, image quality deficiencies associated with the different camera system types, and corresponding sets of tuning parameters configured to repair the image quality deficiencies;

applying the first set of the tuning parameters to the inbound image data to generate adjusted image data without changing operation of the remote camera system or a communication pathway through which the inbound image data is received, the first set of the tuning parameters including at least two of:

(a) modulation transfer function (MTF) compensation applied responsive to sharpness being outside the respective pre-selected target range, (b) white balance or color correction adjustments applied responsive to color being outside the respective pre-selected target range, (c) contrast compensation that modifies tone scale applied responsive to contrast being outside the respective pre-selected target range, (d) noise reduction filtering applied responsive to noise or signal-to-noise ratio being outside the respective pre-selected target range, or (e) distortion correction by applying field-adaptive digital zoom processing responsive to distortion being outside the respective pre-selected target range, wherein applying the first set causes respective values of the at least two image attributes classified as outside the respective pre-selected target ranges to be within the respective pre-selected target ranges; and displaying the adjusted image data on a display device for viewing of the adjusted image data by a user.

14. The method of claim 13, further comprising:

determining at least one image quality deficiency based on analyzing the inbound image data, and applying the set of tuning parameters to the inbound image data to mitigate the at least one image quality deficiency in the adjusted image data.

15. A computer program product comprising a non-transitory computer readable storage medium, the non-transitory computer readable storage medium comprising computer executable code configured to be executed by one or more processors to:

analyze inbound image data received at a video modification system after generation of the inbound image data by a remote camera system and before local display of the inbound image data, the inbound image data analyzed by sampling pixel regions across multiple images of the inbound image data to measure a plurality of image-quality values for at least two image attributes selected from sharpness, contrast, color, noise, or distortion, and classifying each of the plurality of image-quality values as within or outside a respective pre-selected target range stored in the non-transitory computer readable storage medium;

determine, based on analyzing the inbound image data, an identity of the remote camera system by comparing the plurality of image-quality values measured from the sampled pixel regions to a set of signature profiles stored in the non-transitory computer readable storage medium, each of the signature profiles associated with a different camera system type and comprising stored values or ranges for a combination of image attributes generated by that camera system type, and identifying, as the identity of the remote camera system, the camera system type whose signature profile has a greatest correspondence with the plurality of image-quality values;

select, from a tuning-parameter database stored in the non-transitory computer readable storage medium, a first set of tuning parameters based on (i) the identity of the remote camera system and (ii) at least two of the image attributes classified as outside the respective pre-selected target ranges, wherein the tuning-parameter database stores associations between different camera system types, image quality deficiencies associated with the different camera system types, and corresponding sets of tuning parameters configured to repair the image quality deficiencies;

apply the first set of the tuning parameters to the inbound image data to generate adjusted image data without changing operation of the remote camera system or a communication pathway through which the inbound image data is received, the first set of the tuning parameters including at least two of:

(a) modulation transfer function (MTF) compensation applied responsive to sharpness being outside the respective pre-selected target range, (b) white balance or color correction adjustments applied responsive to color being outside the respective pre-selected target range, (c) contrast compensation that modifies tone scale applied responsive to contrast being outside the respective pre-selected target range, (d) noise reduction filtering applied responsive to noise or signal-to-noise ratio being outside the respective pre-selected target range, or (e) distortion correction by applying field-adaptive digital zoom processing responsive to distortion being outside the respective pre-selected target range, wherein applying the first set causes respective values of the at least two image attributes classified as outside the respective pre-selected target ranges to be within the respective pre-selected target ranges; and display the adjusted image data on a display device for viewing of the adjusted image data by a user.

16. The computer program product of claim 15, wherein the computer executable code is configured to be executed by the one or more processors to:

determine at least one image quality deficiency based on analyzing the inbound image data; and apply the first set of the tuning parameters to the inbound image data to mitigate the at least one image quality deficiency in the adjusted image data.

* * * * *